(No Model.)  5 Sheets—Sheet 1.

J. H. GARTRELL.
FLUID PRESSURE REGULATING AND INDICATING APPARATUS FOR VULCANIZING HEATERS, &c.

No. 253,692.  Patented Feb. 14, 1882.

Witnesses:
H. Rutherford
Robert Everett

Inventor:
John H. Gartrell
by James L. Norris
Atty.

(No Model.)

5 Sheets—Sheet 2.

J. H. GARTRELL.

FLUID PRESSURE REGULATING AND INDICATING APPARATUS FOR VULCANIZING HEATERS, &c.

No. 253,692.

Patented Feb. 14, 1882.

Witnesses.
J. A. Rutherford
Robert Everett

Inventor.
John H. Gartrell.
by James L. Norris
Atty.

(No Model.)

5 Sheets—Sheet 3.

J. H. GARTRELL.
FLUID PRESSURE REGULATING AND INDICATING APPARATUS FOR VULCANIZING HEATERS, &c.

No. 253,692. Patented Feb. 14, 1882.

Witnesses.
J. A. Rutherford
Robert Everett

Inventor:
John H. Gartrell
by James L. Norris
Atty.

(No Model.) 5 Sheets—Sheet 4.

J. H. GARTRELL.
FLUID PRESSURE REGULATING AND INDICATING APPARATUS FOR VULCANIZING HEATERS, &c.

No. 253,692. Patented Feb. 14, 1882.

Witnesses.
J. A. Rutherford
Robert Everett

Inventor.
John H. Gartrell.
by James L. Norris.
Atty.

(No Model.)

5 Sheets—Sheet 5.

J. H. GARTRELL.
FLUID PRESSURE REGULATING AND INDICATING APPARATUS FOR VULCANIZING HEATERS, &c.

No. 253,692.

Patented Feb. 14, 1882.

Witnesses.
J. A. Rutherford
Robert Everett

Inventor.
John H. Gartrell.
by James L. Norris
Atty.

N. PETERS. Photo-Lithographer, Washington, D. C.

UNITED STATES PATENT OFFICE.

JOHN H. GARTRELL, OF PENZANCE, COUNTY OF CORNWALL, ENGLAND.

FLUID-PRESSURE REGULATING AND INDICATING APPARATUS FOR VULCANIZING-HEATERS, &c.

SPECIFICATION forming part of Letters Patent No. 253,692, dated February 14, 1882.

Application filed June 7, 1881. (No model.) Patented in England December 13, 1878.

*To all whom it may concern:*

Be it known that I, JOHN HUTCHENS GARTRELL, of Penzance, county of Cornwall, England, have invented a new and useful Improved Fluid-Pressure Regulating and Indicating Apparatus for Vulcanizing-Heaters, &c., (for which I have obtained a patent in Great Britain, No. 5,112, bearing date December 13, 1878,) of which the following is a specification.

My invention relates to an improved apparatus or instrument consisting of a gas-regulator or regulating-valve and a steam-pressure gage or indicator, and is chiefly designed for automatically regulating the flow or supply of gas to the burner or burners of boilers or vulcanizers used in the manufacture of dental plates, while indicating the pressure of steam within such boilers. The said apparatus may, however, be employed in connection with boilers for other purposes. One important feature of the said invention is that the said gas-regulator and pressure-gage are combined in or constructed as one instrument, which performs the two functions of indicating the pressure of steam in the boiler and, by regulating the supply of gas to the burner by and according to such pressure, maintaining the same at any determined height or degree.

Figure 1:
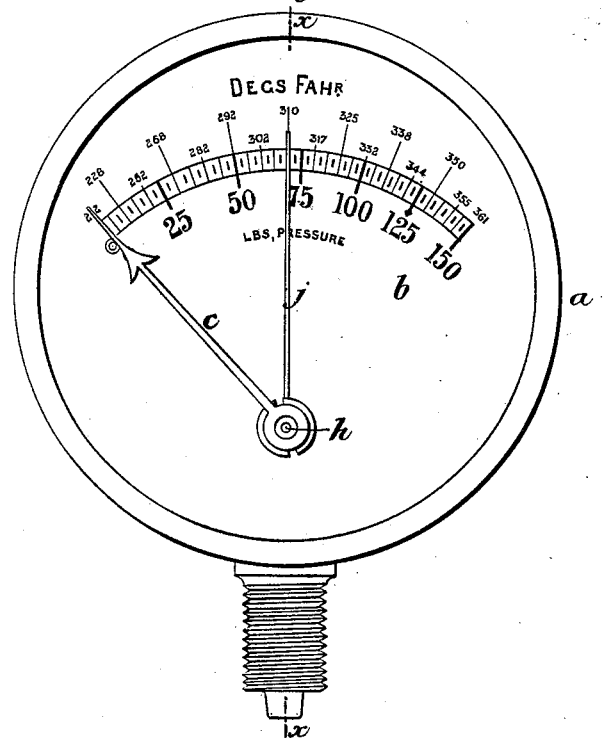
Figure 2:
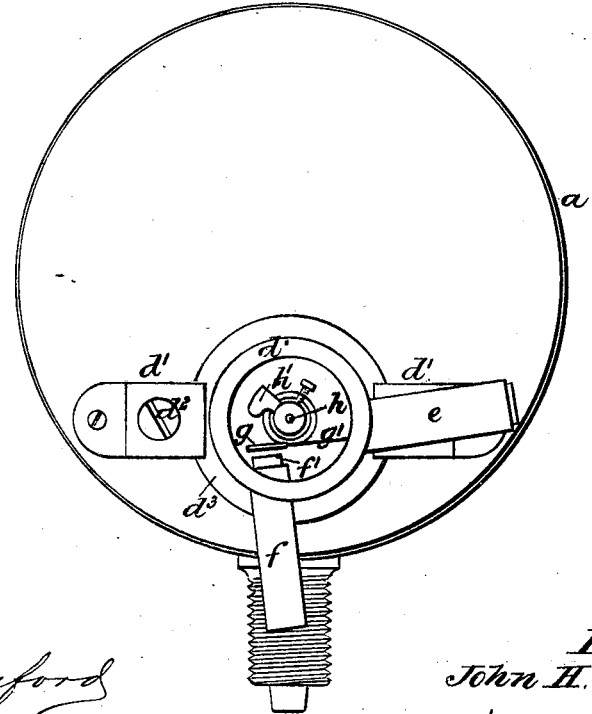
Figure 3:
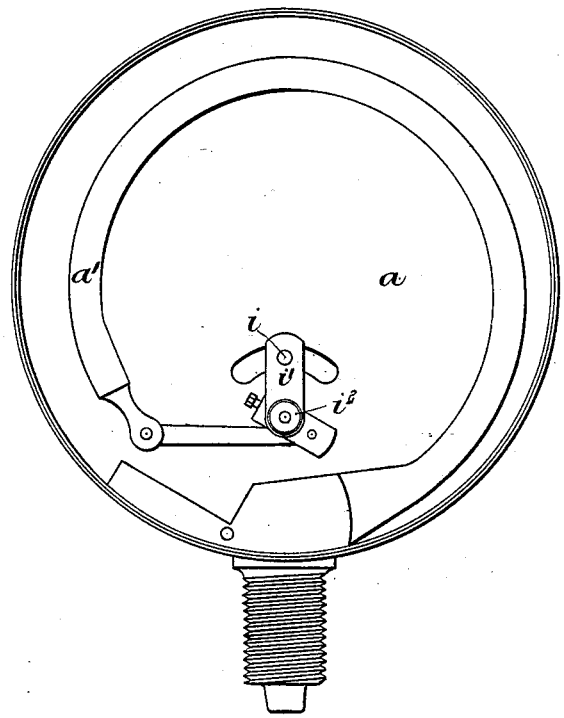
Figure 4:
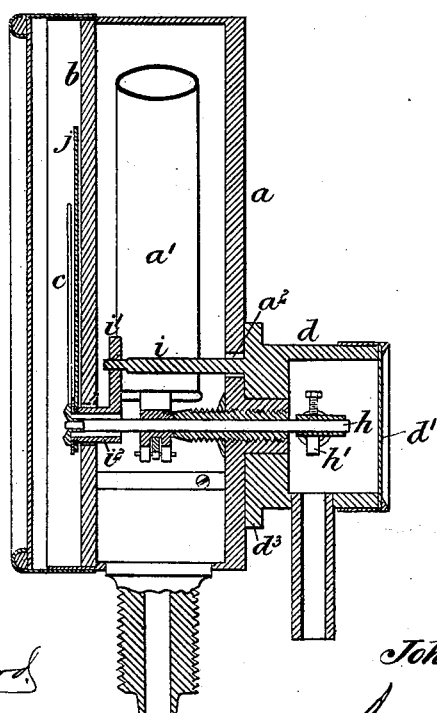
Figure 5:
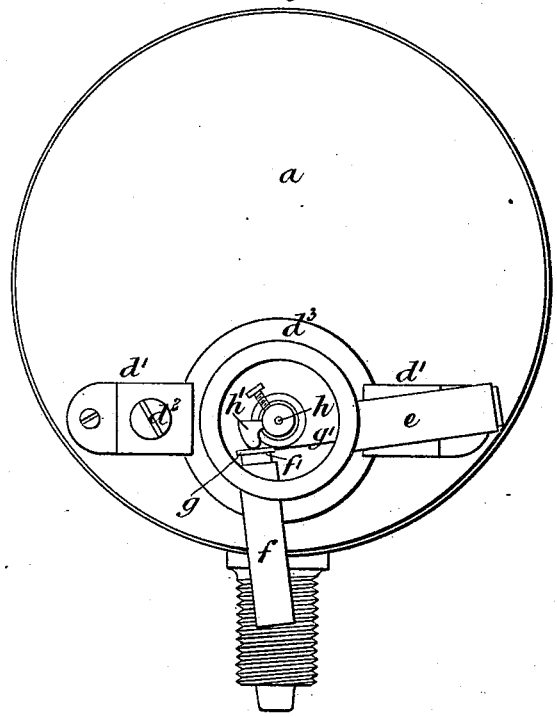
Figure 6:
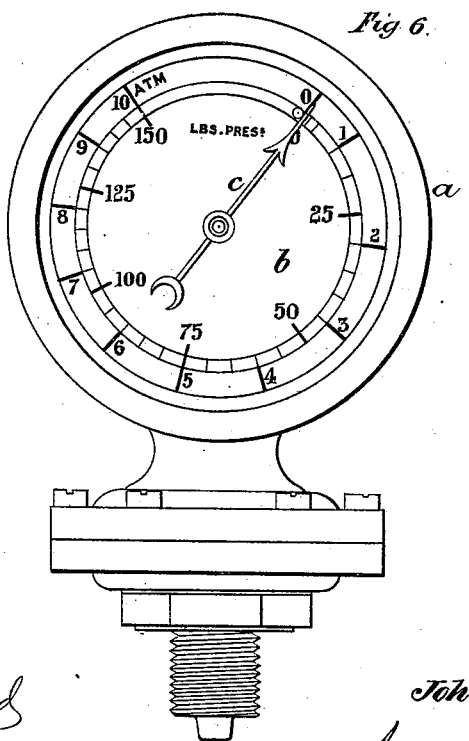

My invention is illustrated in the accompanying drawings, in which Figure 1 is a front view, and Fig. 2 a rear view, of my improved apparatus or combined pressure-gage and gas-regulator. Fig. 3 is a face view with the dial removed; and Fig. 4 is a transverse section on the line $x\,x$, Fig. 1, of the said apparatus. Fig. 5 is a rear view, with some of the parts shown in Fig. 2 in a different position. Fig. 6 is a front view, Fig. 7 a rear view, and Fig. 8 a transverse section on the line $y\,y$, Fig. 7, of a modified form of the said apparatus. Fig. 9 is a face view of the same with the dial removed.

I will first proceed to describe the apparatus illustrated in Figs. 1 to 5, in which $a$ represents a case or box similar to that of an ordinary Bourdon steam-gage, and provided with a dial, $b$, inclosed by a glass face. In front of this dial is arranged the index or finger $c$, which serves to denote on the said dial the pressure of steam in the usual manner. The spindle of this index is connected with the bent tube $a'$, and by its rotation moves the index over the dial as the said tube is expanded or contracted by the pressure of steam therein. In combination with this index, and preferably central with the axis thereof, I arrange at the back of the case $a$ a gas-chamber, $d$, provided with a cover, $d'$, preferably of glass. This gas-chamber, in the arrangement of my invention shown in the above figures, is made capable of adjustment by rotating on the said case $a$, for a purpose hereinafter specified. To this chamber are connected the gas inlet and outlet pipes $e\,f$, the latter extending through the said chamber, as shown in Figs. 2 and 5. While the apparatus is working the inlet-pipe is always open to the gas-chamber. The said gas-inlet pipe is connected with the gas-supply pipe or reservoir and the outlet-pipe with the burner, preferably by pipes of india-rubber or other flexible material. Within the aforesaid gas-chamber is arranged the valve $g$, preferably attached to or formed on a piece, $g'$, of spring-steel, which is secured to the chamber $d$ or within the inlet-pipe. This spring tends to constantly withdraw or withhold the valve $g$ from its seat at the mouth $f'$ on the outlet-pipe, as shown in Fig. 2, and thereby permits the gas to pass freely through the said pipe to the burner. In combination with this valve I arrange upon the index-spindle $h$ an arm or tappet, $h'$, which rotates with the said spindle, and which, while the pressure in the boiler is rising, approaches the valve $g$ by reason of the rotation of this spindle upon its axis, and when the desired or determined limit of pressure is reached will act on the said valve $g$ and close, or nearly close, the same.

The apparatus as above described is all that is necessary to form a combined gage and regulator if one invariable limit of pressure were to be used; but I provide for working with any limit of pressure as may be desired at any time by the person using the apparatus, as follows:

Attached to the gas-chamber $d$ is a rod or pin, $i$, which passes through a slot, $a^2$, in the back of the case, and is attached to an arm, $i'$, having a boss, $i^2$, surrounding the index-spindle $h$. On this boss is placed a finger or pointer, $j$, whose position on the dial will vary according to the position of the aforesaid valve and valve-seat, and by turning the box $d$, and thereby varying the position of the said valve relatively to the tappet which acts thereon, the said pointer $j$ may be set to any of the indications or figures representing on the dial degrees of heat or pressure. Therefore when the actual steam-pressure reaches a degree corresponding with the figure to which this pointer is set—that is to say, when the position of the index $c$ coincides with that of the pointer $j$—the tappet $h'$ will bear on the valve $g$ and close the pipe $f$, thereby cutting off entirely or partially the free supply of gas to the heater or burner.

$d^4$ $d^4$ represent spring plates or pieces, which may be clamped by the screws $d^2$ upon the annular flange $d^3$ of the chamber $d$, to prevent any accidental movement of the pointer $j$ when adjusted to the desired position.

It will be obvious that by the above-described arrangement of the combined indicator and regulator the quantity of gas supplied to the burner is regulated by and according to the desired pressure of steam in the boiler, such pressure being at the same time and by the same instrument indicated by the index on the dial.

Figure 7:
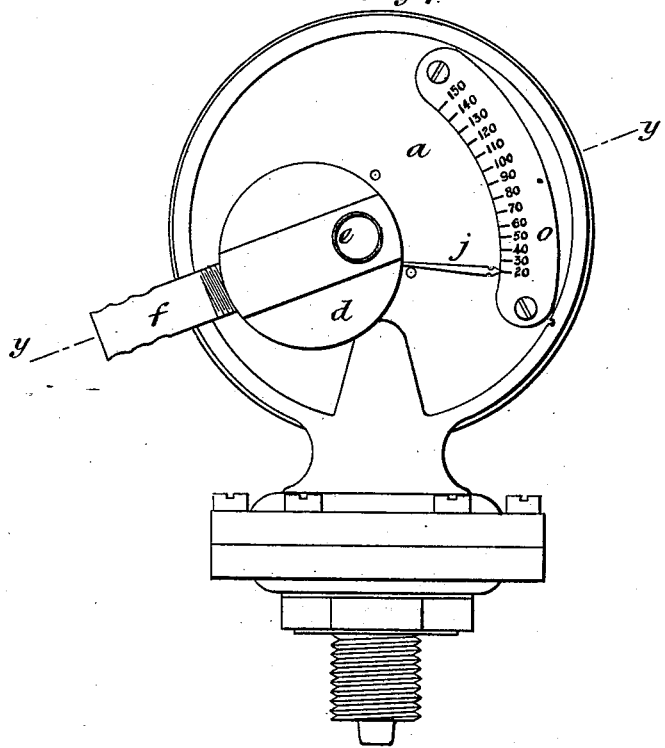
Figure 8:
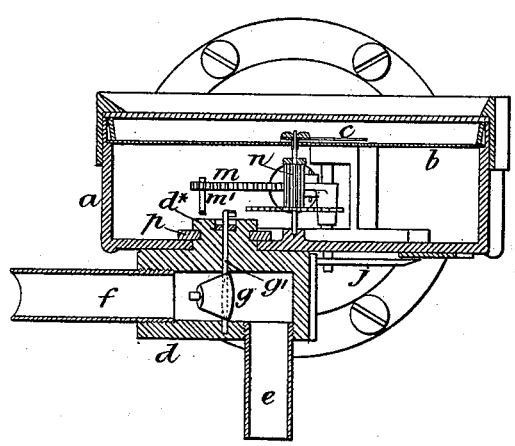
Figure 9:
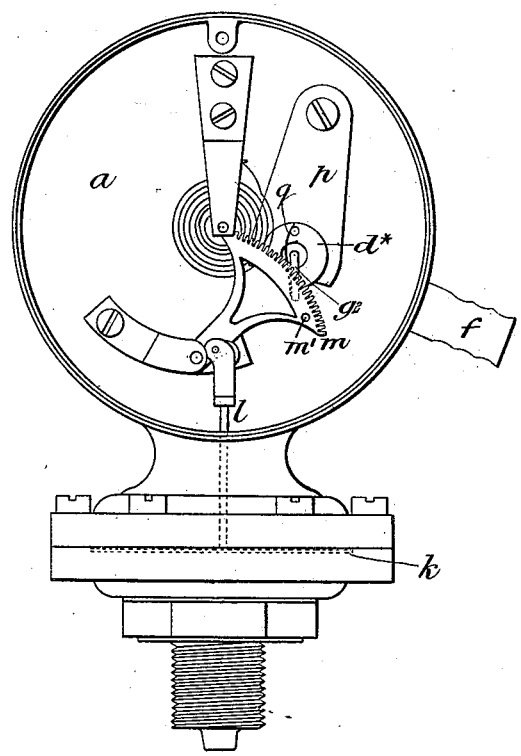

In Figs. 6 to 9 I have shown my improvements applied to a diaphragm-gage—that is to say, a pressure-gage whose index $c$ is moved by the action of the steam from the boiler upon the diaphragm $k$. This movement of the index is produced through the rod $l$, segmental rack $m$, and the pinion $n$ on the index-spindle. Instead, however, of arranging the pointer $j$ and gas-chamber $d$ central with the axis of the finger $c$, as above described, I arrange the said gas-chamber eccentric to the case of the apparatus and to one side of the axis of the index, and attach to the said chamber at the rear of the case $a$ the pointer $j$, which can be set by turning the chamber $d$ upon its axis to any one of the indications on the dial $o$, arranged at the rear of the apparatus, as shown in Fig. 7. The said chamber $d$ is preferably held in the case $a$ by a plate, $p$, screwed to the back of the same, and forked at one end to enter an annular recess in the neck $d^*$ of the said box.

To effect the closing of the outlet-pipe $f$ when the pressure of steam in the boiler reaches a predetermined limit, I employ a throttle-valve, $g$, arranged in close proximity to the mouth of the said outlet-pipe. The portion $g^2$ of the stem $g'$ of this valve is bent at a right angle to its other portion, and is acted upon by a spring, $q$, which tends to keep such valve open except when acted upon by a pin, $m'$, in the segmental rack $m$. This pin when the index or finger $c$ reaches an indication on the dial $b$ corresponding to that opposite the pointer $j$ on the dial $o$, will come in contact with the part $g^2$ and turn the valve $g$ upon its axis to close or nearly close the outlet-pipe, its action and effect being similar to those of the valve $g$ in the apparatus first herein described.

Having thus fully described the said invention and shown how the same may be conveniently and advantageously carried into practice, I wish it understood that I do not limit myself to the precise construction, arrangement, and combination of the parts of my improved apparatus as herein described, and illustrated in the accompanying drawings, as various forms of pressure-gages may be combined with my improved gas-regulating devices without departing from the principle of my invention, which consists essentially, as above stated, in providing in one instrument means both for indicating the pressure of steam within a boiler and for regulating the supply of gas to the burner or heater of the same by and according to the desired pressure of such steam; and

I claim—

1. The combination, in a fluid-pressure regulating and indicating apparatus, of the pointer $c$, actuated by the means, substantially as described, for denoting the steam-pressure, with the valve arranged to be closed at a predetermined time by the devices that move the said index-hand, and the pointer $j$, adjustable with the valve, whereby by adjusting the valve this index will indicate the pressure at which the valve will be closed, substantially.

2. The combination, with the pointer $c$, actuated by devices operated by steam-pressure, and including means for acting upon and closing the valve of the pointer $j$, connected with and moved by the adjustable gas-chamber casing $d$, and the valve carried by said casing, whereby the adjustment of the latter will vary the position of the valve with relation to the device which closes the same, and which is operated by the devices that control the movement of the pointer $c$, substantially as described.

JOHN HUTCHENS GARTRELL.

Witnesses:
J. C. V. CROCKER,
PETER OLDS.